United States Patent Office 3,469,513
Patented Sept. 30, 1969

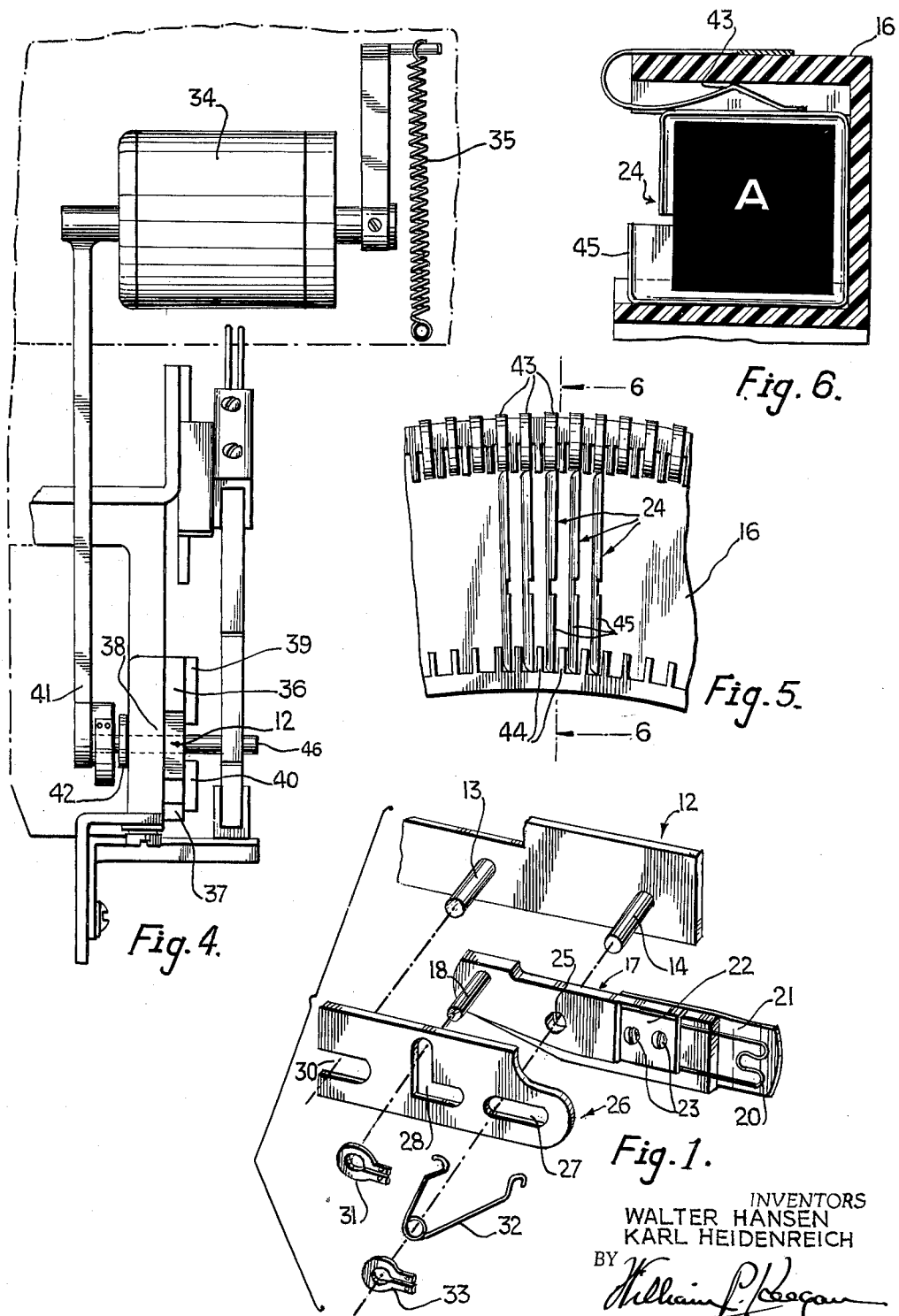

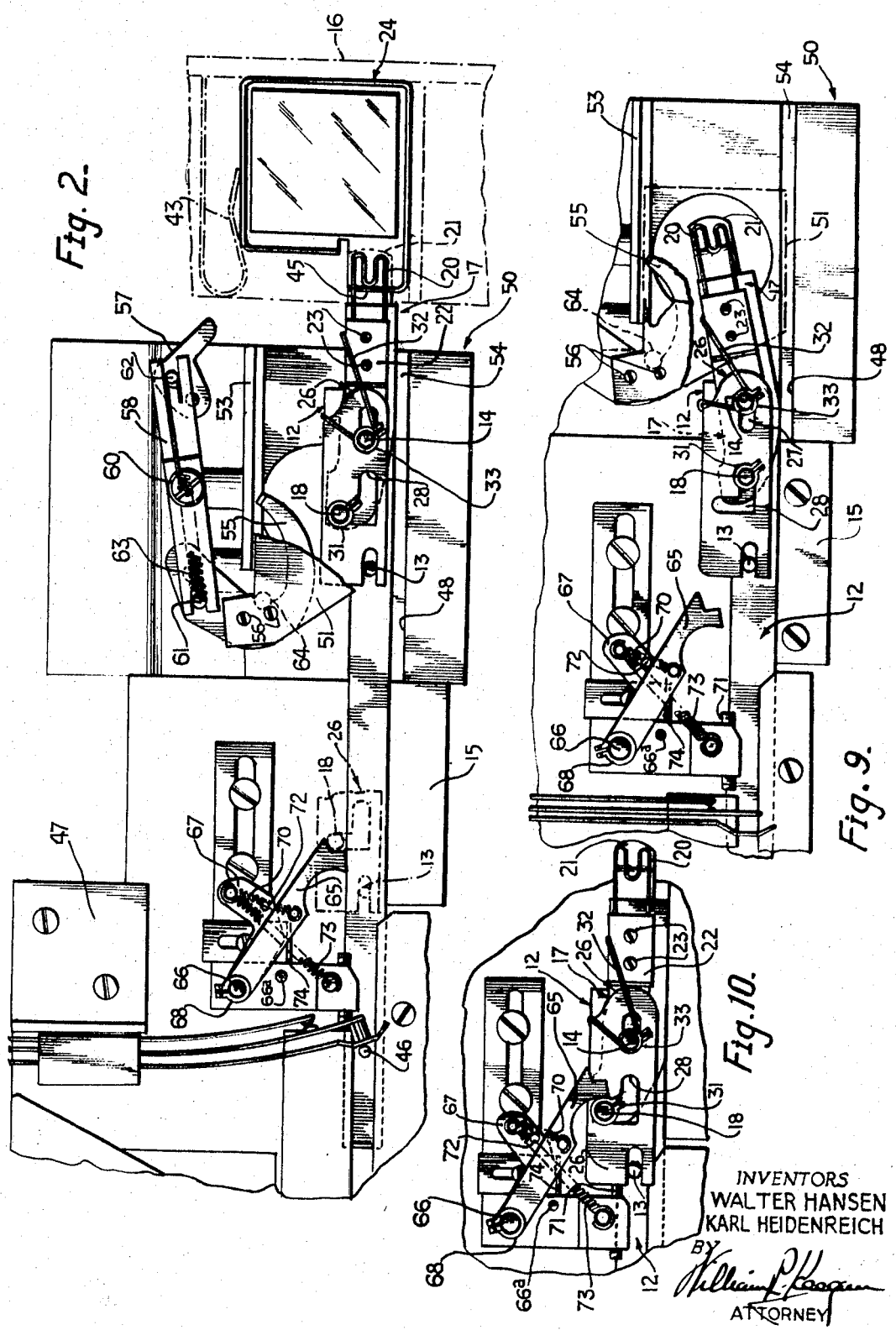

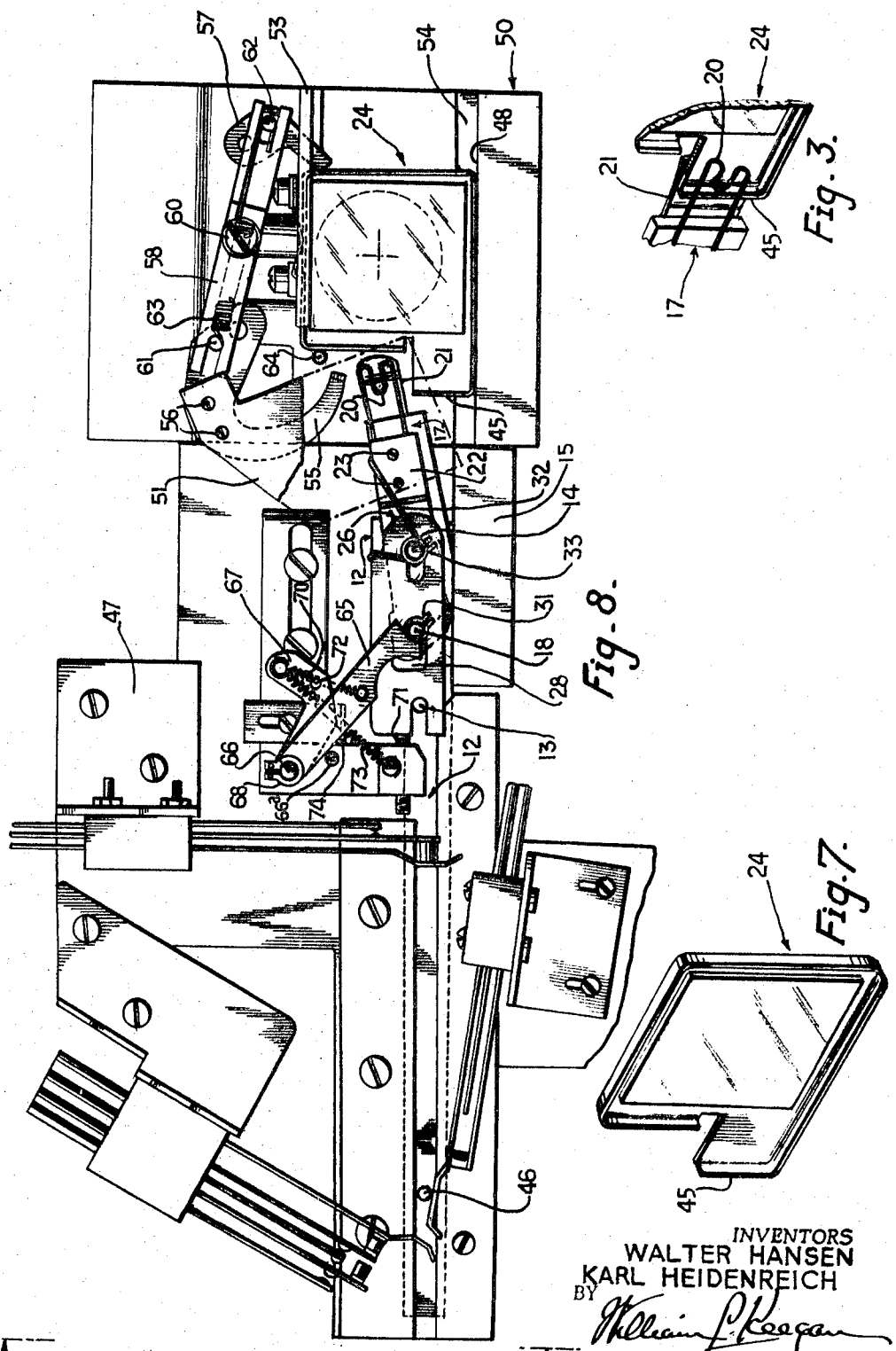

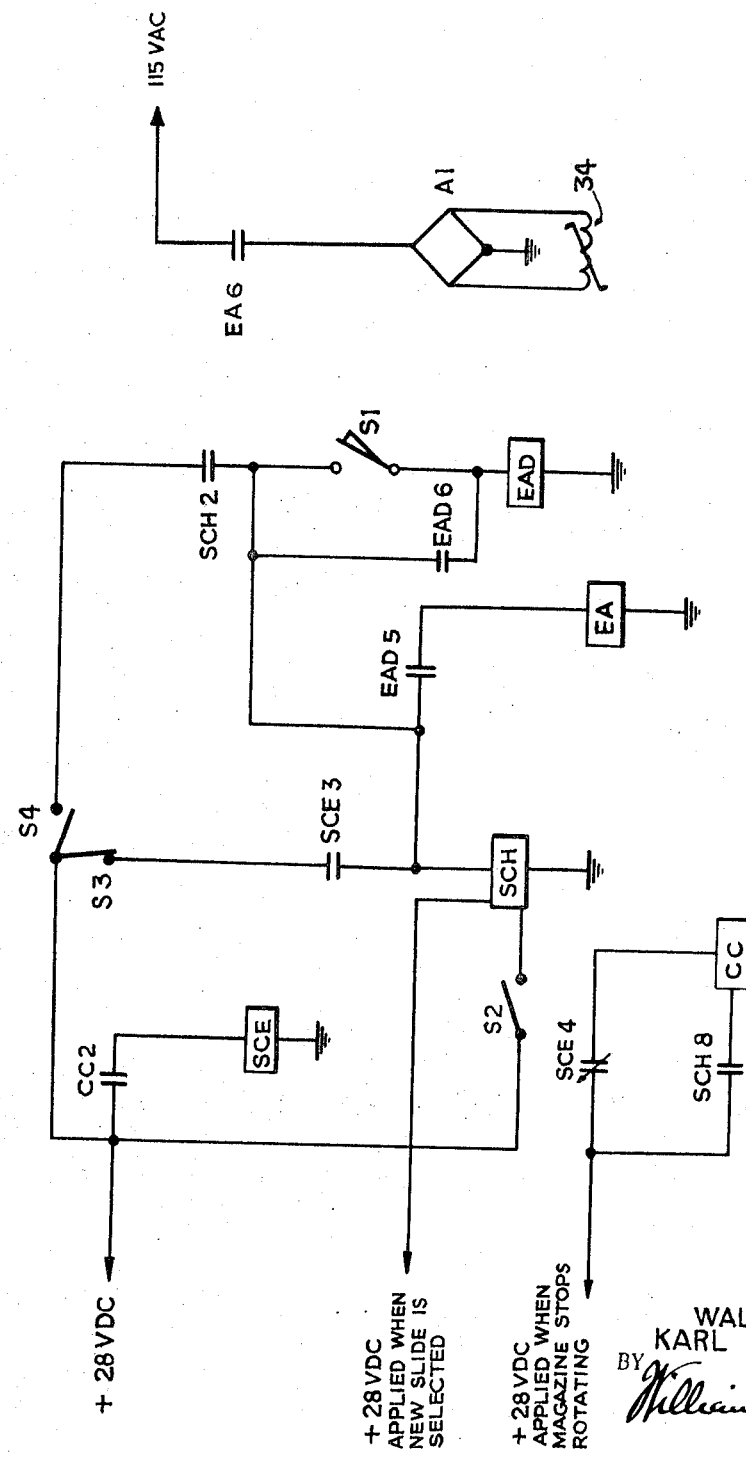

3,469,513
SLIDE AND MECHANISM FOR PHOTOGRAPHIC DRAFTING MACHINES
Walter Hansen, Cold Spring Harbor, and Karl Heidenreich, Brooklyn, N.Y., assignors to Eltra Corporation, Brooklyn, N.Y.
Filed Jan. 25, 1967, Ser. No. 611,648
Int. Cl. B41b *13/06, 19/00*
U.S. Cl. 95—4.5                    4 Claims

ABSTRACT OF THE DISCLOSURE

A special symbol slide for use in a photographic drafting machine and a slide actuating device for removing the slide from a storage magazine, bringing it to a photographic position, and restoring it to the storage magazine after the slide symbol has been photographed.

Background of the invention

The present invention relates to an apparatus for photographically preparing schematic wiring diagrams or the like, and more particularly, to a specially designed slide used in such an apparatus with characters or symbols formed thereon and a device for extracting the slide from a storage magazine, moving it to the photographic location and returning it to its original storage position in the magazine after the character or symbol is photographed.

This invention is especially suitable for use in conjunction with a photogrtphic drafting apparatus of the type described in the copending application Ser. No. 576,398, filed Aug. 31, 1966. With this drafting apparatus, it is possible to construct various types of diagrams on photographic material by successively selecting the symbols and lines comprising the diagram and exposing them onto the photographic material. The symbols are selected at a keyboard and projected simultaneously upon a film surface and a viewing screen to which is attached a previously prepared layout draft of the particular diagram being constructed. The symbol image can be moved about to coincide with its location on the layout draft and, when thus positioned, this image is exposed on the film causing both a latent and a patent image to be produced. The patent image is provided to enable the machine operator to see the extent of his work and to facilitate the precise preparation of the diagram. After the selection and exposure of several symbols, the operator can connect them as required by printing on the film in a desired relation to said symbols lines of different lengths, widths, and types.

In the specification and drawing for this drafting apparatus, the device used to extract a symbol-bearing slide from its storage magazine and the slide itself were merely shown schematically since many different types of slides and slide actuating means could have been provided. It is an object of the present invention to provide a slide which can be housed in a rotary storage magazine used in a drafting apparatus of the type disclosed in the aforementioned application. It is a further object to provide an extraction device for removing such a slide from its magazine, placing the slide in photographic position, and returning it to its magazine position. Thereafter the device returns the slide to the magazine and itself returns to its standby position to await the selection of another slide.

Summary

The slide described above comprises a frame into which is set a base upon which a character or symbol is formed as a negative photographic image. This frame has a projecting, curled lip which offers a convenient engagement point for a slide extracting device. The extraction device, in turn, comprises a gripping member mounted upon a sliding member; the latter is made to move bi-directionally and first advances into an adjacently located slide magazine, grips a desired slide and pulls the engaged slide into a photographic position.

The foregoing, and other objects, features and advantages of the invention, will be apparent from a more particular description of a preferred embodiment of the invention as illustrated in the accompanying drawings.

Brief description of the drawings

In the drawings:
FIG. 1 is an exploded schematic view of the gripping components and the moveable member upon which they are mounted;
FIG. 2 is a detailed view of the invention in a slide-engaging position;
FIG. 3 is a detailed view of the slide gripper fully engaged with a slide;
FIG. 4 is an end view taken along line 4—4 of FIG. 8 showing a part of the mechanism and a solenoid and spring which propel the moveable member;
FIG. 5 is a detailed side view of a slide held in its storage magazine;
FIG. 6 is a detailed front view of the slide taken along line 6—6 of FIG. 5;
FIG. 7 is a detailed view of the slide;
FIG. 8 is a detailed view of the invention in the slide-return position;
FIGS. 9 and 10 are detailed views of the invention in positions assumed after the return of a slide; and
FIG. 11 is a schematic wiring diagram of the circuit used to control the cycle of operation.

For a general understanding of the invention, reference may be had to FIGS. 1 through 10 wherein the various parts comprising the extraction device are shown assembled and in detail. The electrical circuit required to control the operation of the device is shown in FIG. 11 and is considered in detail after the mechanical description of the invention.

Description of the preferred embodiment

FIG. 1 shows the slidably mounted elements of the extraction device in an exploded-type view while FIG. 2 shows these elements assembled and in a slide-extracting position. Referring to FIGS. 1 and 2, sliding member 12 has pins 13 and 14 mounted on its surface and is designed to be moved laterally over the face of the extraction device housing 15 either towards storage magazine 16 or away from it. Slide gripper 17 is an irregularly-shaped member, tapered at one end as shown. Pin 18 is mounted on the tapered end while a loop spring 20 and a flat spring 21 are mounted to the outside surfaces of the opposite end by bracket 22 and screws 23. When gripper 17 is moved into engagement with slide 24 these springs are coupled to the slide as shown in FIG. 3. The gripper is connected to sliding member 12 by pin 14 passing through hole 25.

Locking member 26 is provided with an elongated slot 27 through which pin 14 projects and an L-shaped slot 28 through which pin 18 projects. The locking member also provides an open-ended slot 30 through which pin 13 projects. Hooked spring 32 fits over pin 14 and its two ends hook over the locking member and gripper 17. The spring exerts a downward pressure on the gripper wherever its extraction end (the end with the mounted springs) becomes elevated. Member 12, gripper 17, member 26, and spring 32 are secured in a unit assembly by ring clips 31 and 33. When all these elements are in the assembled state shown in FIG. 2, two features are readily apparent: the gripper can pivot a short distance about pin 14, due to the freedom of movement of pin 18 within L-shaped slot 28, and locking member 26 has a lateral freedom of movement within the limits of slots 27, 28 and 30. The significance of these features (which will be developed more fully later in this specification) is that when the gripper is pivoted about pin 14, pin 18 can become entrapped either in the toe or the apex of slot 28 thereby forcing the gripper into an angular (slide-return) position or level (slide-engaging) position, respectively. As mentioned above, sliding member 12 is moved laterally right and left in FIG. 2 carrying with it the gripper 17 and locking member 26 attached to it. The sliding member is moved by the co-action of a solenoid 34 and a return spring 35. Referring to FIG. 4, member 12 is shown to be slidably mounted between upper guide spacer 36 and lower guide spacer 37 and is maintained in contact with housing 38 by guide 39 and lower guide 40. Arm 41 of solenoid 34 is connected to raised element 42 atached to the body of the sliding member. When the solenoid is energized it propels the sliding member by element 42 toward the slide magazine. When the solenoid is deenergized, spring 35 pulls the member away from the slide magazine.

Having described the operation of sliding member 12, gripper 17 and locking member 26, a complete cycle of slide extraction and return will be discussed. FIG. 2 shows gripper in its slide extraction position with a slide actually engaged and this position will be considered the start of an operational cycle.

Referring to FIG. 2, sliding member 12 has been urged from its initial position towards slide magazine 16 by energization of solenoid 34. Slide gripper 17, in its level, slide-extraction position, has been thrust into the magazine and has engaged slide 24. The slide is normally held in a slide magazine, a portion of which is shown in FIG. 5. The magazine is toroidal in shape, its outer perimeter containnig a row of mounted leaf springs 43 and a row of teeth equidistant from the springs. Each slide is seated between two of the teeth and is maintained in an upright position by the pressure of a leaf spring on its top surface. The slide is so situated that projecting edge 45 is facing outwardly and is in a direct line with the gripper when the latter is in its slide extraction position. The actual engagement of the gripper with the slide is shown in detail in FIG. 3 while FIG. 7 shows the slide in detail. Referring to these two figures, the inner loop of loop spring 20 is bent slightly inwardly towards spring 21 so as to be non-aligned with the two outer sides. When the gripper makes contact with the projecting edge 45 of the slide, flat spring 21 passes behind the edge while loop spring 20 is forced upward over its lip. Once the inner loop of the loop spring carries past the lip, it resumes its normal, non-aligned position. It becomes obvious that if sliding member 12 is now moved away from the slide magazine, the gripper loop spring can no longer slide back over the lip of the slide since the loop will catch on the inner side of the lip.

The sliding member is retracted when pin 46 (FIG. 2) strikes and closes the contacts of switch 47. This deenergizes the solenoid and the return spring causes solenoid arm 41 to urge sliding member 12 away from the storage magazine and the slide out of the magazine. This action will occur a short time after the slide is engaged. As the slide emerges from the magazine, it is guided onto track 48 formed by a raised portion of slide holder 50.

Slide holder 50 is a fixed part of the drafting apparatus previously mentioned and is adapted to hold the slide securely on the optical axis of the apparatus. The holder is seen to comprise a fixed block to which are mounted a shutter 51 and a mechanism for rotating this shutter. Since the drafting apparatus described in the aforementioned co-pending application employs a continuously illuminated light source, the shutter is provided to block the passage of light to the sensitized surface when an image is not being projected from a slide. The rotating mechanism pivots the shutter out of the light path when a slide is being presented and restores it to its light blocking position when the slide is removed from the slide holder.

As the slide enters track 48, it is prevented from tilting forward by upper slide guide 53 and lower slide guide 54. As the slide progresses over the face of the slide holder, its upper left side contacts pivot lever 55 and begins pushing it to the left. Shutter 51 is mounted on two columns 56 and projecting horizontally from the surface of slide lever 55. The slide lever and slide pusher 57 are held against a raised surface of the slide holder by slide pusher link 58 which, in turn, is attached to the slide holder by screw 60. Lever 55 pivots about pin 61, link 58 pivots about screw 60 and pusher 57 pivots about pin 62. As lever 55 is pushed to the left by the intruding slide, it pivots clockwise about pin 61 causing shutter 51 to also rotate clockwise. Link 58 and pusher 57 are also forced to turn clockwise about their respective pivot points. The arm of pusher 57 first comes down on top of the slide and then falls to the right side as the slide continues its leftward progress. As the slide lever pivots, pin 61 describes an arc which, at its widest point, causes spring 63 connected to pins 61 and 62 to become extended. With the continued rotation of pin 61, however, a point is reached where tension on the spring is suddenly relieved allowing it to compress. In compressing, it accelerates the rotation of the slide lever pulling it out of the slide's path and forces the slide pusher to exert a force against the right side of the slide. The slide's progress is halted when its left edge is brought up against stop pin 64 mounted on the slide holder. At the same time, the gripper and the locking frame have moved leftward to the point where pin 18 has contacted slide retractor arm 65. Referring to FIG. 8, slide retractor arm is attached to, and pivots on, pin 66 which is, in turn, secured to the slide holder frame. Underneath arm 65 is L-shaped arm 67, also mounted on, and pivotable about, pin 66. Both arms are secured to pin 66 by ring clip 68. As pin 18, mounted on gripper 17, contacts arm 65, it produces a downward pressure on the arm, forces it to pivot clockwise about pin 66 until stopped by pin 66A, and stretches spring 70. As this occurs, pin 18 is also forced downward into the toe of slot 28, causing gripper 17 to pivot counterclockwise about pin 14. The tapered end of the gripper is pushed down while its spring end is pivoted upwardly out of contact with the slide. As is seen in the drawing, that portion of the slide frame is not provided with a lip thus permitting the unimpeded movement of the gripper. The gripper cannot regain its level position because pin 18 is pushed into the toe of slot 28 and has no vertical play.

At this point then, as shown in FIG. 8, shutter 51 has been made to rotate out of the light path, gripper 17 has been disengaged from slide 24 and has assumed its slide return position, and the slide is held in holder 50 while the image on the slide is photographed. A slide return signal will energize the solenoid and the sliding member will again be moved towards the slide magazine. As pin 18 is moved away from slide retractor arm 65, the arm is pulled upward to its normal position by spring 70. The gripper again contacts the slide, but this time, because of its raised attitude, it does not become coupled to the slide and so merely pushes the slide. As the slide is pushed to the right, its right edge forces pusher 57 to pivot counterclockwise. The rotation of link 58 and lever 55 described above is reversed and spring 63 will return shutter 51 to its normal position after the slide passes out of the holder. The slide is pushed along guides 53 and 54 until it is once again seated in the slide magazine. As described above, switch 47 is closed deenergizing the solenoid and causing the gripper to be retracted.

FIG. 9 shows the gripper, still at an angle, retreating away from the slide magazine and passing beneath the slide lever 55. As it continues its travel, it is obvious that pin 18 will not strike slide retractor arm 65 as it did when a slide was being extracted since pin 18 is still in the toe of slot 28. The lateral left movement will not be arrested until locking member 26 hits stop screw 71. Member 26 can advance no further but sliding member 12 is still urged to the left by the return spring 35 and continues its travel carrying gripper 17 with it. The gripper therefore continues its leftward advance until pin 18 reaches the vertical portion of slot 28 where it is forced upwardly when the gripper, responding to the continuous force exerted by spring 32 on its coupling head, pivots about pin 18 and returns to its level, slide extraction position. Should the gripper again receive a signal to advance into the slide magazine, it is once again carried laterally to the right by sliding member 12. Slide retractor arm 65 is pushed upward by pin 18 as the gripper proceeds to the right. As arm 65 is pushed up, it in turn pushes arm 67 exerting a force at pin 72. As pin 18 clears arm 65, spring 73 returns arm 65 to its previous position and spring 70 returns arm 67 to its previous position (resting on shelf 74), sliding member, gripper and locking member pass behind the shutter and engage the slide ass hown in FIG. 2 thus completing an entire operational cycle.

This completes a description of the mechanical aspects of the invention. A detailed description of the electrical control circuit is now presented. Assuming that a slide has been selected for presentation, the following paragraphs describe the electrical circuit required to make the slide gripper do the following: extract a slide from the magazine; retract while holding the slide, leave the slide in the projection position and finally return the slide to its magazine.

Referring to FIG. 11, when the slide selection has been made and the slide magazine has been rotated to a point where the slide can be retracted, control cycle relay CC is energized through contacts SCE4. Contacts CC2 close energizing slide change enable relay SCE. Slide change holding relay SCH and extractor actuator relay EA are then energized through now closed contacts SCE3 and a holding circuit is established for relay CC through contacts SCH8 since contacts SCE4 have opened. Contacts EA6 close applying 115 vac to bridge rectifier A1 which supplies power to extractor actuator solenoid 34. The action of the solenoid forces the gripper forward into the slide magazine where it engages the slide. As the gripper moves forward, it mechanically closes switches S1, S2 and S4, and opens switch S3. Relay SCH is now held energized through switch S2, and extractor actuator relay EAD is energized by switch S4, still closed contacts SCH2 and switch S1. Contacts EAD6 close providing a holding path around switch S1 while contacts EAD5 open causing relay EA to be deenergized. Contacts EA6 open removing power from solenoid 34. The gripper, with the symbol slide engaged, is withdrawn from the magazine by a return spring and pulls the slide into photographic position. As the gripper withdraws, it opens switches S1 and S2 but leaves switch S4 closed. Relays EAD and SCH are deenergized; contacts SCH8 open deenergizing relay CC which in turn deenergizes relay SCE. All active circuits have now been deenergized and will remain so until another symbol is to be selected.

Upon selection of another symbol, 28 v. DC is applied to relay SCH energizing it. Contacts SCH2 close to energize relay EA through switch S4 and contacts EAD5. Contacts EA6 close energizing solenoid 34. The gripper,
its coupling head mechanically raised at an angle, is again forced forward and pushes the slide back into its position on the slide magazine simultaneously closing switches S1 and S2. Relay EAD is energized and EA deenergized as described in the previous paragraph. Contacts EA6 open removing power from solenoid 34 whereupon the gripper is spring returned to its rest position. In its return passage switches S1, S2, and S4 are opened while switch S3 is closed. The gripper is again ready to extract a new slide when the magazine comes to rest and the input signal energizing relay CC is sent.

What is claimed is:

1. For use in a photographic drafting machine having a magazine for storing a plurality of symbol slides, which magazine is movable to bring a selected slide to a position where the slide can be removed from the magazine to a photographic station and thereafter restored to its storage position in the magazine, a slide extraction mechanism comprising a slide gripping member having spring means for engaging a slide, said gripping member being pivotable between a horizontal slide extracting position and an angular slide restoring position, a sliding member to which said gripping member is pivotally connected, means for moving said sliding member between a first terminal position wherein said gripping member grips a slide in the storage magazine and a second terminal position wherein said gripping member is in its withdrawn position, a locking member slideably connected to said sliding member and adapted to hold said gripping member in its angular position, spring means for biasing said gripping member to its horizontal position, and means for setting said gripping member alternately in its horizontal and angular positions for successive movements of sliding member between its second and first terminal positions and return.

2. A slide mechanism according to claim 1 including means actuated by a slide being moved into photographic position for biasing said slide into the photographic position.

3. A slide mechanism according to claim 2 wherein said slide actuated means includes a shutter that is moved out of the photographic position when a slide is moved into said position.

4. The combination with a slide extracting mechanism according to claim 2 of a slide comprising a negative of a diagram symbol and a holder for said negative characterized in that the holder is a metal frame having a circumferential rim and that on one side the rim is discontinuous and laterally spaced apart whereby the gripping mechanism of the slide extracting mechanism can pivot between the two segments of the rim on the one side of the slide holder.

References Cited
UNITED STATES PATENTS

| 2,732,758 | 1/1956 | Waller | 40—79 X |
| 2,976,787 | 3/1961 | Robbins | 95—4.5 |
| 3,204,522 | 9/1965 | Wadsworth. | |

EUGENE R. CAPOZIO, Primary Examiner

RICHARD CARTER, Assistant Examiner

U.S. Cl. X.R.

40—79; 95—12; 353—116, 118